(12) United States Patent
Vadnais

(10) Patent No.: US 10,422,116 B2
(45) Date of Patent: *Sep. 24, 2019

(54) STABILIZER SUPPORT

(71) Applicant: John Vadnais, Stillwater, MN (US)

(72) Inventor: John Vadnais, Stillwater, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/223,315

(22) Filed: Dec. 18, 2018

(65) Prior Publication Data

US 2019/0119893 A1    Apr. 25, 2019

Related U.S. Application Data

(63) Continuation of application No. 14/412,046, filed as application No. PCT/US2013/054279 on Aug. 9, 2013, now Pat. No. 10,190,299.

(60) Provisional application No. 61/816,967, filed on Apr. 29, 2013, provisional application No. 61/683,250, filed on Aug. 15, 2012.

(51) Int. Cl.
```
E03C 1/322     (2006.01)
E03D 1/012     (2006.01)
F16B 5/06      (2006.01)
F16M 13/02     (2006.01)
F16B 2/22      (2006.01)
```

(52) U.S. Cl.
CPC ............ *E03D 1/012* (2013.01); *F16B 5/0635* (2013.01); *F16M 13/02* (2013.01); *F16B 2/22* (2013.01); *F16B 5/06* (2013.01); *Y10T 29/49826* (2015.01)

(58) Field of Classification Search
CPC ............ E03D 1/012; F16M 13/02; B25B 3/00
USPC ............ 248/544, 644, 200.1, 207, 212, 213, 248/213.2, 214, 215, 224.7, 225.21, 248/227.1, 298.1, 305, 316.7, 354.1, 248/354.6, 906, 351–353, 354.5, 354.7; 4/643, 648, 419, 252.1, 252.2, 252.3; 269/3, 6

See application file for complete search history.

(56) References Cited

U.S. PATENT DOCUMENTS

| | | | | |
|---|---|---|---|---|
| 1,464,398 | A | * | 8/1923 | Ahern ................ E03D 1/26 4/417 |
| 1,575,477 | A | * | 3/1926 | Dixon ................ E03D 11/16 4/240 |
| 2,035,301 | A | * | 3/1936 | Daugherty ........... E03C 1/324 248/201 |
| 2,233,342 | A | * | 2/1941 | Crozier ............... E03C 1/322 4/648 |
| 2,283,794 | A | * | 5/1942 | Crozier ............... E03C 1/324 4/648 |
| 2,810,136 | A |   | 4/1955 | Kearney |

(Continued)

*Primary Examiner* — Terrell L McKinnon
*Assistant Examiner* — Michael McDuffle
(74) *Attorney, Agent, or Firm* — Sherrill Law Offices, PLLC

(57) ABSTRACT

The present invention relates to a stabilizer support 10 and a method of using the stabilizer support 10 to support a laterally unsupported surface 100. The stabilizer support 10 has a longitudinally extending rigid beam 20, a clip 30, and a foot plate 40. The beam 20 has a longitudinal length 21, a longitudinal first end 22, and a longitudinal second end 23. The beam 20 is marked at graded intervals 50 along its longitudinal length 21. The clip 30 is configured and arranged to engage the first longitudinal end 22 of the beam 20 and the foot plate 30 is configured and arranged to engage the second longitudinal end 23 of the beam 20.

7 Claims, 13 Drawing Sheets

(56) References Cited

U.S. PATENT DOCUMENTS

| | | | | |
|---|---|---|---|---|
| 3,146,890 | A * | 9/1964 | Cowper | D06F 57/12 |
| | | | | 211/119.009 |
| 3,666,225 | A | 5/1972 | Weinberger | |
| 3,810,597 | A * | 5/1974 | Flegel | E03C 1/324 |
| | | | | 248/214 |
| 4,488,651 | A * | 12/1984 | Bishop | A47K 3/38 |
| | | | | 211/105.6 |
| 4,525,971 | A * | 7/1985 | Kern | E04B 9/06 |
| | | | | 403/232.1 |
| 4,842,239 | A * | 6/1989 | Kinsey | B63H 20/36 |
| | | | | 248/351 |
| 5,497,926 | A * | 3/1996 | Rittenhouse | A61G 5/10 |
| | | | | 224/407 |
| 5,499,725 | A * | 3/1996 | Palumbo | A47K 3/001 |
| | | | | 211/105.1 |
| 5,653,415 | A * | 8/1997 | Schworer | E04G 25/061 |
| | | | | 248/354.1 |
| 5,794,903 | A * | 8/1998 | Peterson, II | A47B 97/00 |
| | | | | 248/300 |
| 6,443,318 | B1 * | 9/2002 | Welsch | A47B 43/00 |
| | | | | 211/103 |
| 7,648,111 | B2 * | 1/2010 | Goldstein | A47H 1/022 |
| | | | | 248/200.1 |
| 8,459,600 | B2 * | 6/2013 | Tarr | A63H 19/36 |
| | | | | 211/124 |
| 2011/0121148 | A1 * | 5/2011 | Pernia | B60R 11/0229 |
| | | | | 248/207 |
| 2011/0277412 | A1 * | 11/2011 | Karam | E04G 23/0207 |
| | | | | 52/514 |
| 2017/0306599 | A1 * | 10/2017 | Beck | F16M 13/02 |

* cited by examiner

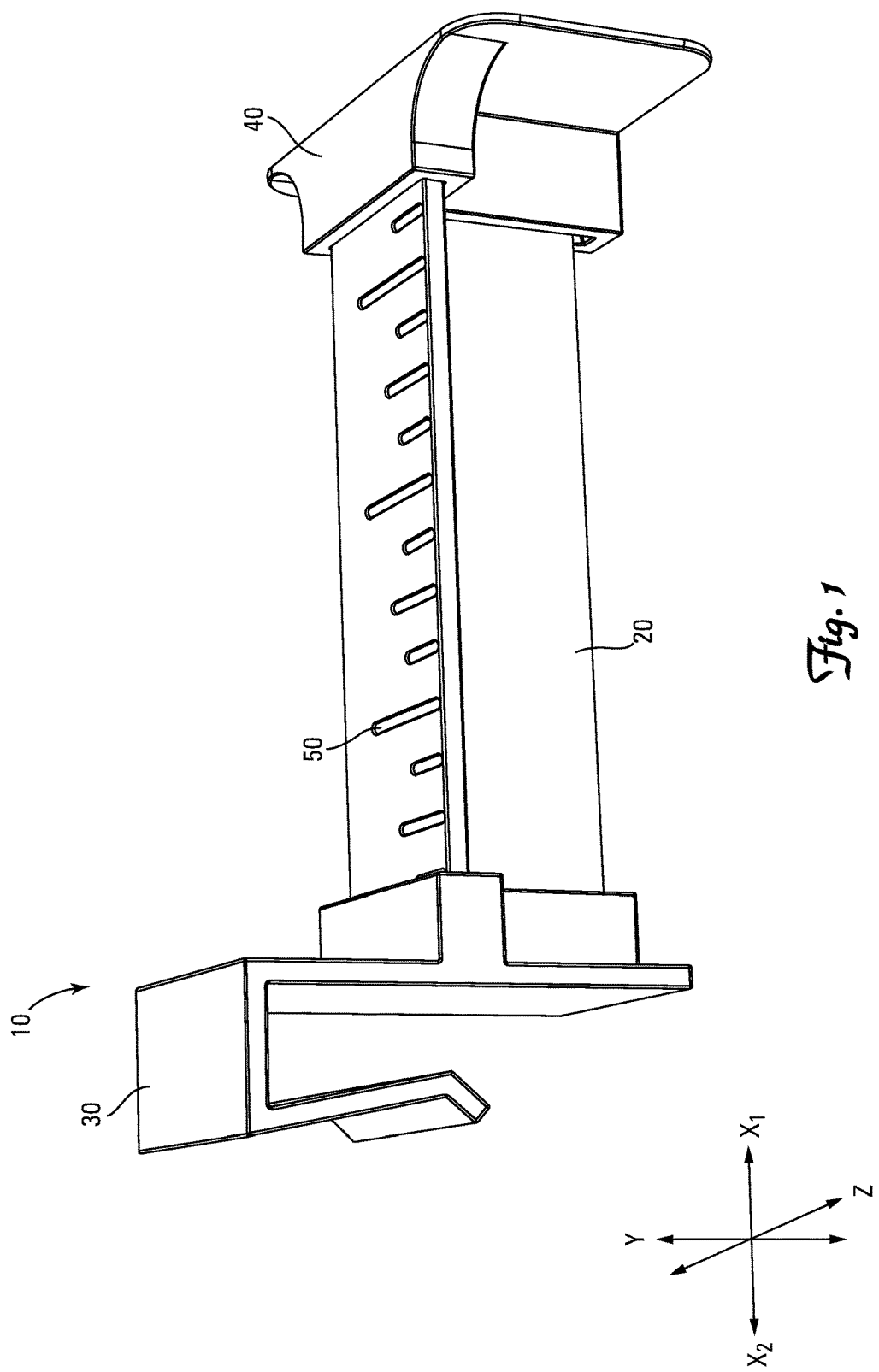

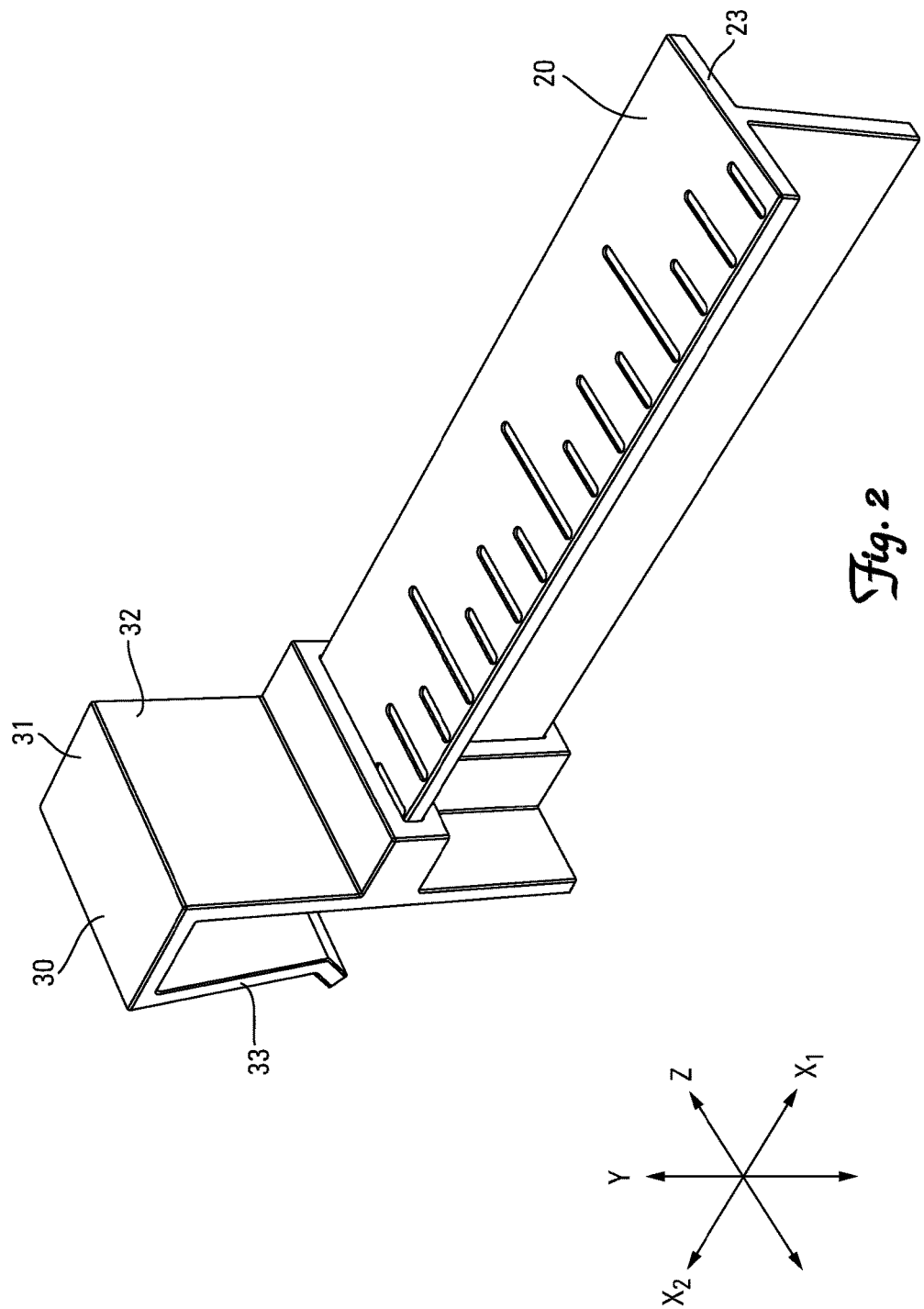

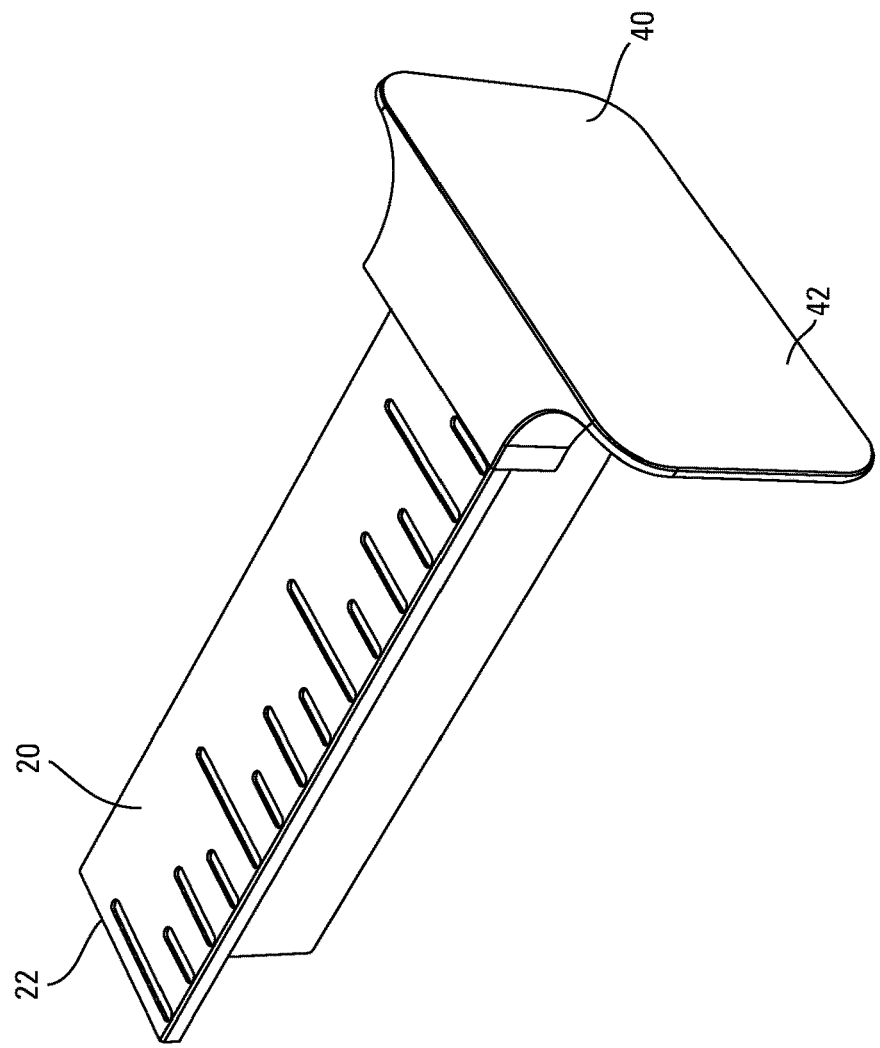
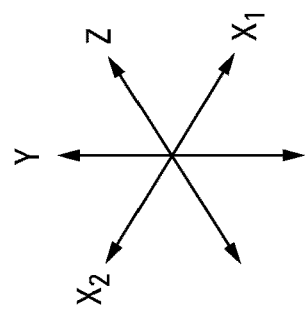

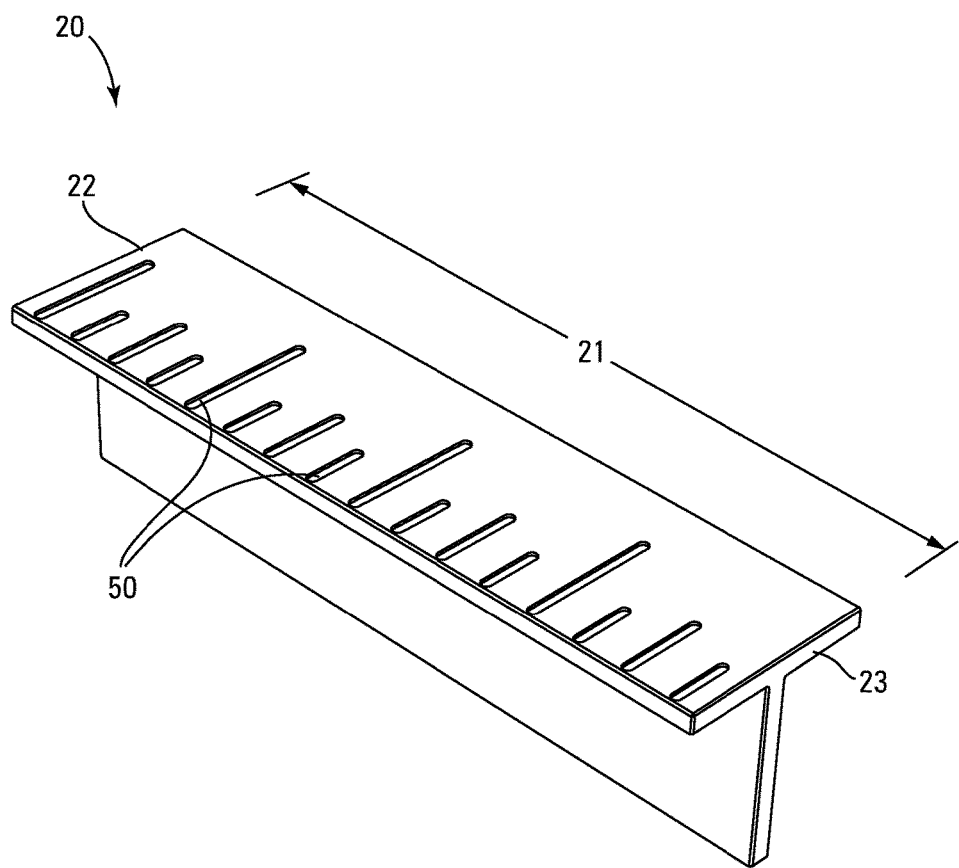
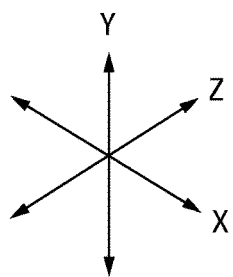
Fig. 4A

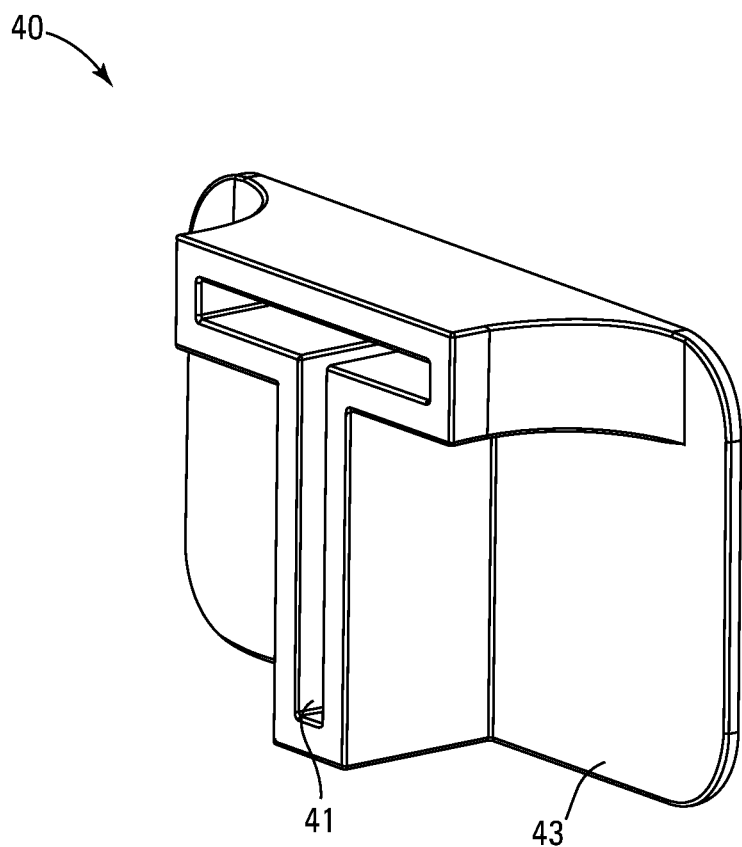
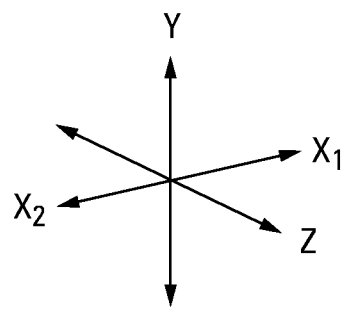
Fig. 6

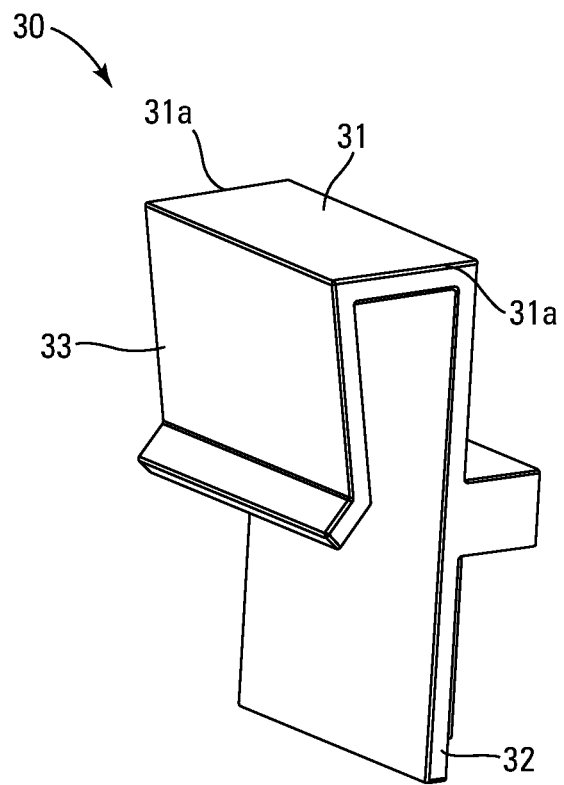
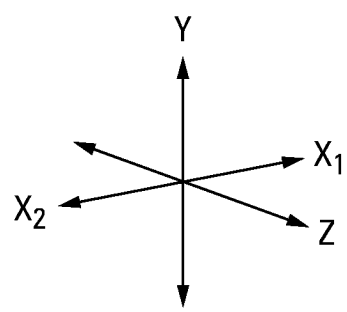
Fig. 7

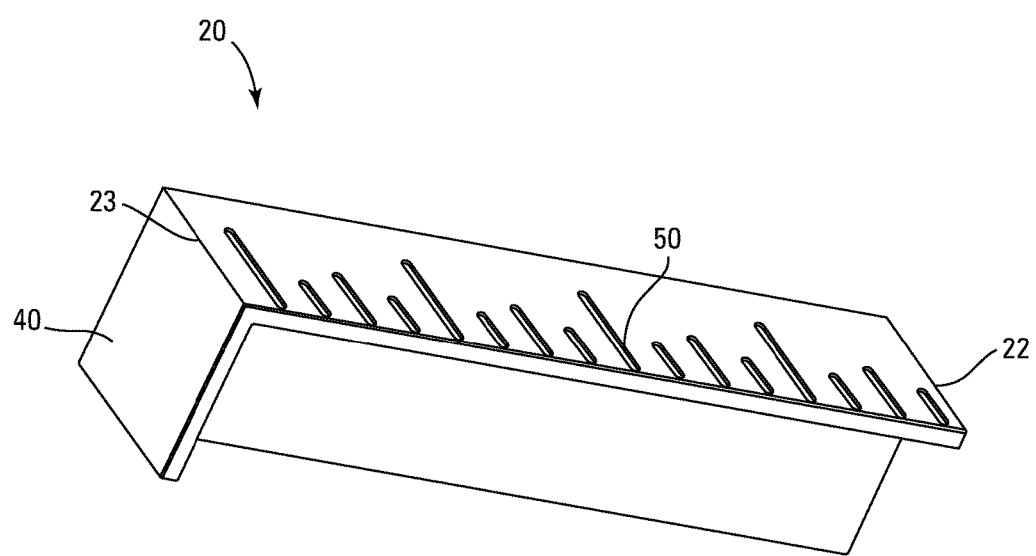
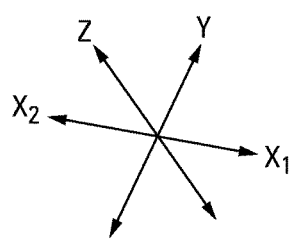
Fig. 10

STABILIZER SUPPORT

BACKGROUND

Many laterally unsupported surfaces placed near walls form a gap between the unsupported surface and the wall. Movement of the laterally unsupported surface due to use of the item or movement of the floor near the item can cause damage to the item or the wall. An example of this is a toilet flush tank. When the toilet flush tank is installed in a bathroom a gap can form between the back of the tank and the wall. Many toilets experience rocking or other movement at the connection point between the toilet tank and the toilet bowl. This movement can create leaks, cracks, and flooding problems at the connection point. A common reaction to this prevent movement is to tighten the fasteners at the connection point of the tank and bowl. Over tightening the fasteners can cause the tank or bowl to crack and may not completely prevent the movement. Other devices used to prevent or limit the movement of the tank include wedges and complex brackets. The wedges are often unsightly and unstable. The available brackets often require fasteners to affix the pieces to the wall or laterally unsupported surface. The space in which to insert the stabilizer is often small and awkward to measure and insert tools to secure the bracket. Hence, a need exists for a simple, inexpensive and appropriately sized bracket for stabilizing a laterally unsupported surface.

SUMMARY OF THE INVENTION

A first aspect of the invention is a stabilizer support. The stabilizer support has a longitudinally extending rigid beam, a clip, and a foot plate. The beam has a longitudinal length, a longitudinal first end, and a longitudinal second end. The beam is marked at graded intervals along its longitudinal length. The clip is configured and arranged to engage the first longitudinal end of the beam and the foot plate is configured and arranged to engage the second longitudinal end of the beam.

A second aspect of the invention is a method of stabilizing a laterally unsupported surface with a stabilizing attachment in accordance with the first aspect of the invention. The method includes the steps of (i) obtaining a stabilizer support in accordance with the first aspect of the invention, (ii) placing a longitudinal end of the beam into direct physical contact with a wall behind a laterally unsupported surface, (iii) measuring the distance between the wall and the unsupported lateral surface using the graded intervals marked on the beam, (iv) removing the portion of the longitudinal end of the beam to produce an exposed end such that the longitudinal length of the beam from the exposed end to a point of engagement with the clip or foot plate on the opposite end is the same as the measured distance; (v) engaging the missing foot plate or clip to the exposed end of the beam, and (vi) placing the stabilizer support in a gap formed between the wall and the laterally unsupported surface wherein the clip engages the laterally unsupported surface and the beam extends longitudinally to the wall such that the foot plate engages the wall.

BRIEF DESCRIPTION OF THE DRAWINGS

FIG. 1 is a side perspective view of one embodiment of the stabilizer support.

FIG. 2 is a top perspective view of the stabilizer support in FIG. 1 with the foot plate removed.

FIG. 3 is a top perspective view of the stabilizer support in FIG. 1 with the clip removed.

FIG. 4A is a top perspective view of the beam of the stabilizer support in FIG. 1.

FIG. 6 is front perspective view of the foot plate in FIG. 5.

FIG. 7 is a back perspective view of the clip of the stabilizer support in FIG. 1.

FIG. 10 is a side perspective view of the integrally formed beam and foot plate in FIG. 9.

DETAILED DESCRIPTION OF A PREFERRED EMBODIMENT

Definitions

As utilized herein, the term "engage" means integrally form, removably attach, or fixedly attach.

As utilized herein, the terms "engaged" or engagement" mean integrally formed, removably formed, or fixedly attached.

| | Nomenclature |
|---|---|
| 10 | Stabilizer support |
| 20 | Beam |
| 21 | Length |
| 22 | First end |
| 23 | Second end |
| 24 | Aperture |
| 30 | Clip |
| 31 | Center portion |
| 31a | End |
| 32 | First leg |
| 33 | Second leg |
| 34 | Channel |
| 35 | Aperture |
| 40 | Foot plate |
| 41 | Channel |
| 42 | First lateral side |
| 43 | Second lateral side |
| 50 | Graded intervals |
| 60 | Lines of Weakness |
| 100 | Laterally unsupported surface |
| 200 | Wall |
| X | Longitudinal direction |
| $X_1$ | First longitudinal direction |
| $X_2$ | Second longitudinal direction |
| Y | Lateral direction |
| Z | Transverse direction |

Construction

Figure 4B:
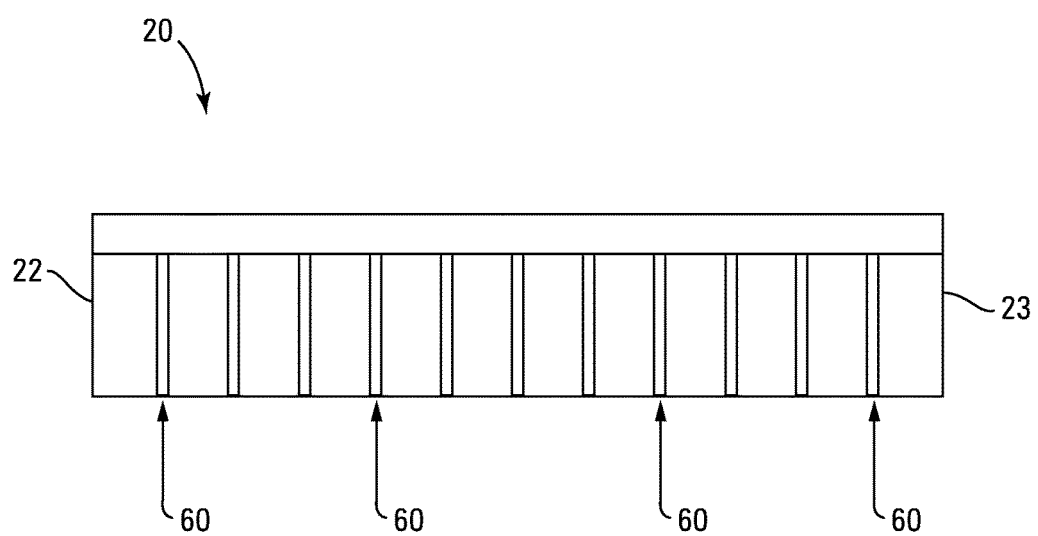
FIG. 4B is a side view of an alternative beam for use in assembly of the stabilizer support depicted in FIG. 1.
Figure 5:
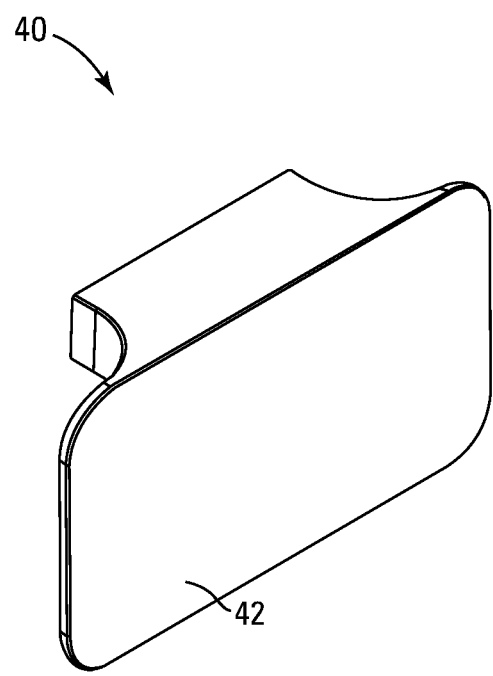
FIG. 5 is rear perspective view of the foot plate of the stabilizer support in FIG. 1.
Figure 12:
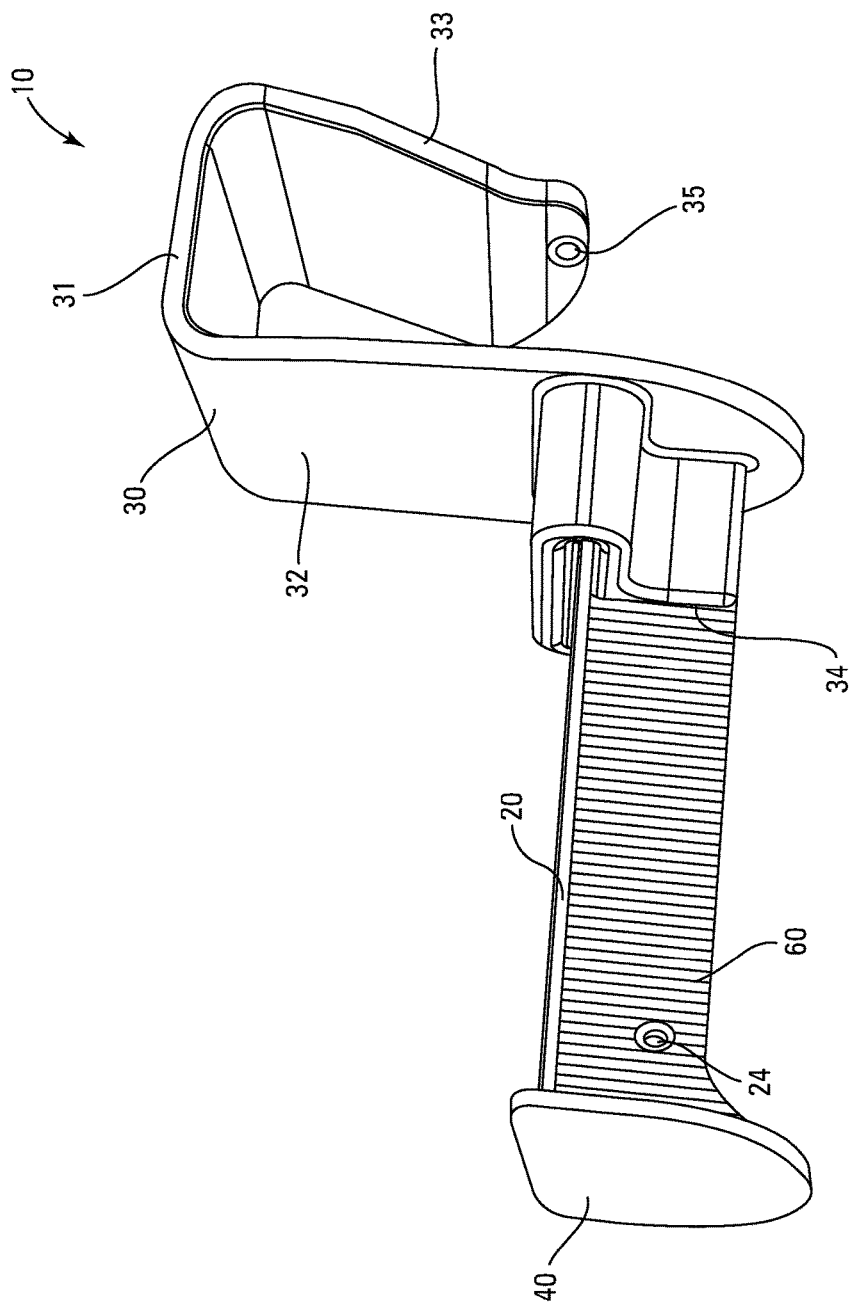
FIG. 12 is a side perspective view of a second embodiment of the stabilizer support with an aperture through the second leg of the clip and the beam.

Referring to FIG. 1, the stabilizer support 10 has a rigid beam 20, a clip 30, and a foot plate 40. As shown in FIG. 4A, the beam 20 has a longitudinal length 21, a longitudinal first end 22, and a longitudinal second end 23. The beam 20 may be made from any suitable material such as wood, plastic, paper, or metal. Preferably the beam 20 is made from plastic to provide rigidity to the beam 20 while allowing it to be cut or broken to adjust the longitudinal length 21 for use. As shown in FIGS. 4B and 12, the beam 20 may include a longitudinal sequence of regularly spaced lines of weakness 60 (e.g., lines of perforation or decreased thickness every $1/4^{th}$ to $1/8^{th}$ of an inch) on the beam 20 for purposes of facilitating cutting or breaking of the beam 20 along a line of weakness 60. By providing the lines of weakness 60 only along the laterally Y extending portion of the beam 20 (i.e., the vertically extending underside plate of the beam) as shown in FIG. 4B, the lines of weakness 60 facilitate cutting or breaking of the beam 20 (i.e., cut along a selected line of weakness 20 followed by repeated laterally bending of the horizontal plate portion of beam 20 immediately above the cut until the horizontal plate breaks) without weakening the beam 20 so as to render it ineffective for its intended purpose of stabilizing a laterally unsupported surface 100 by providing a support between the laterally unsupported surface 100 and a wall 200.

Preferably the beam 20 is marked at graded intervals 50 along the longitudinal length 21 of the beam 20. The graded intervals 50 may be along the length 21 from the first longitudinal end 22 to the second longitudinal end 23 or just a portion of the longitudinal length 21. The graded intervals 50 may be equally spaced from each other along the length 21 or at any other appropriate interval to facilitate measurement of a gap (not numbered) formed between a wall 200 and a laterally unsupported surface 100.

As shown in FIG. 12, the beam 20 may also have an aperture 24 through the laterally Y extending portion of the beam 20 (i.e., the vertically extending underside plate of the beam). The aperture 24 is configured and arranged to hold implements (not pictured) such as air freshener, a toilet brush, plunger, etc. between the wall 200 and the laterally unsupported surface 100 (i.e. toilet tank) to be hidden from view.

Figure 8:
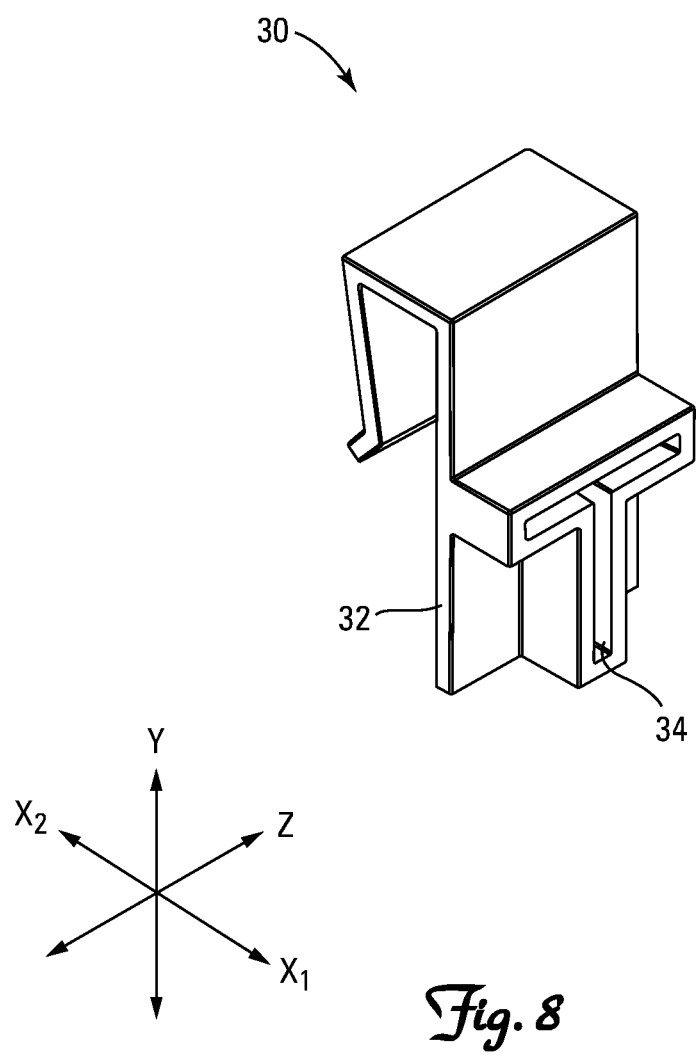
FIG. 8 is a front perspective view of the clip in FIG. 7.

The clip 30 may be configured and arranged to grip, clasp, or hook to a laterally unsupported surface 100. Preferably the clip 30 is generally U-shaped. As shown in FIGS. 7 and 8, most preferably the clip 30 has a center portion 31 located intermediate and secured at opposite longitudinal ends 31a to substantially laterally extending first leg 32 and second leg 33 to allow the clip 30 to engage a laterally unsupported surface 100 such as a toilet tank side wall. The clip 30 is configured and arranged to engage the first longitudinal end 22 of the beam 20.

As shown in FIG. 12, the clip 30 may also have an aperture 35 through the second leg 33. The aperture 35 is configured and arranged to allow a product such as a toilet sanitizer (not shown) to be attached to the second leg 33 when the clip 30 engages a laterally unsupported surface 100 such as a toilet tank side wall.

As shown in FIGS. 3, 5, 6, and 10, the foot plate 40 is configured and arranged to engage the second longitudinal end 23 of the beam 20. Preferably the foot plate 40 has a substantially flat transversely extending first lateral side 42 to allow for maximum physical contact with a wall 200.

The longitudinally extending beam 20, clip 30, and foot plate 40 may be separate and distinct components. If the beam 20, clip 30, and foot plate 40 are separate and distinct components, the clip 30 may be configured and arranged for attachment to the first longitudinal end 22 of the beam 20 and the foot plate 40 may be configured and arranged for attachment to the second longitudinal end of the beam 20. Preferably the clip 30 and foot plate 40 are configured and arranged for removable attachment to the beam 20.

As shown in FIG. 8, the clip 30 may have a channel 34 extending in the first longitudinal direction $X_1$ configured and arranged to attach to the first end 22 of the longitudinally extending beam 20. As shown in FIG. 6, the foot plate 40 may also have a channel 41 extending in the second longitudinal direction $X_2$ on the second lateral side 43 configured and arranged to attach to the second end 23 of the longitudinally extending beam 20.

Figure 9:
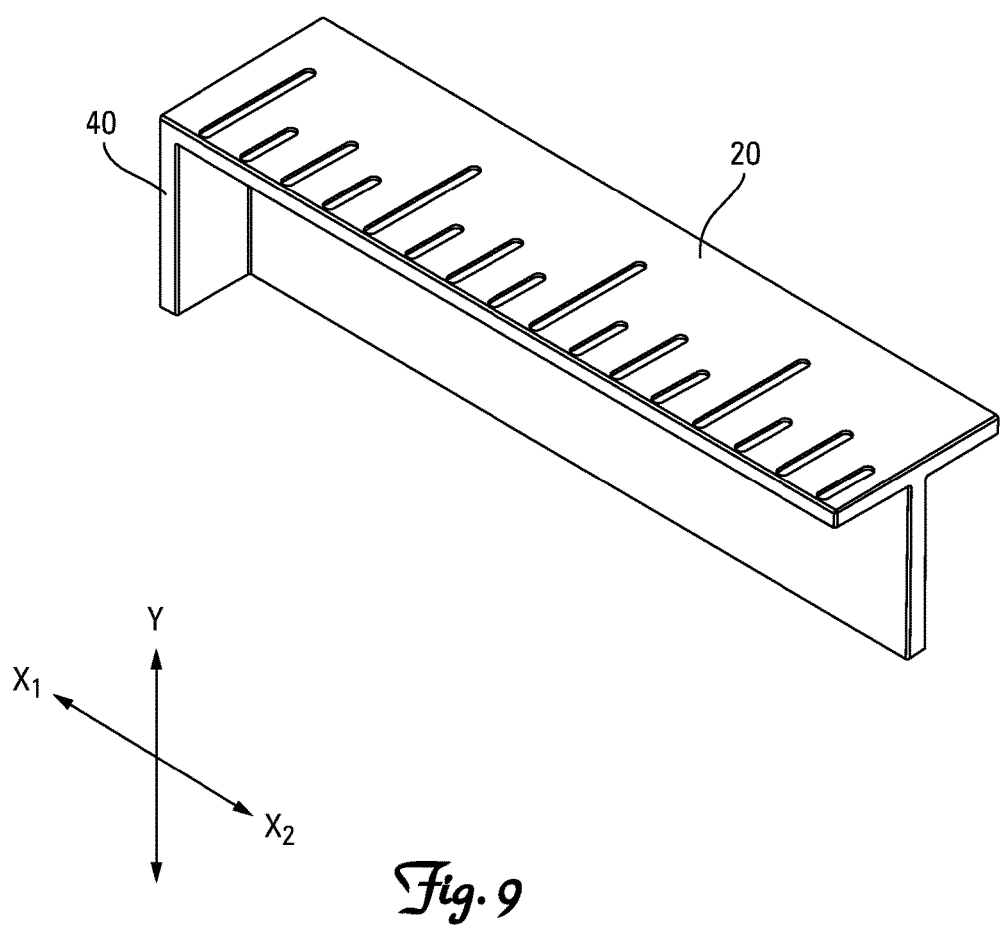
FIG. 9 is a top perspective view of a beam and foot plate integrally formed that could be used with the clip in FIG. 7.
Figure 11:
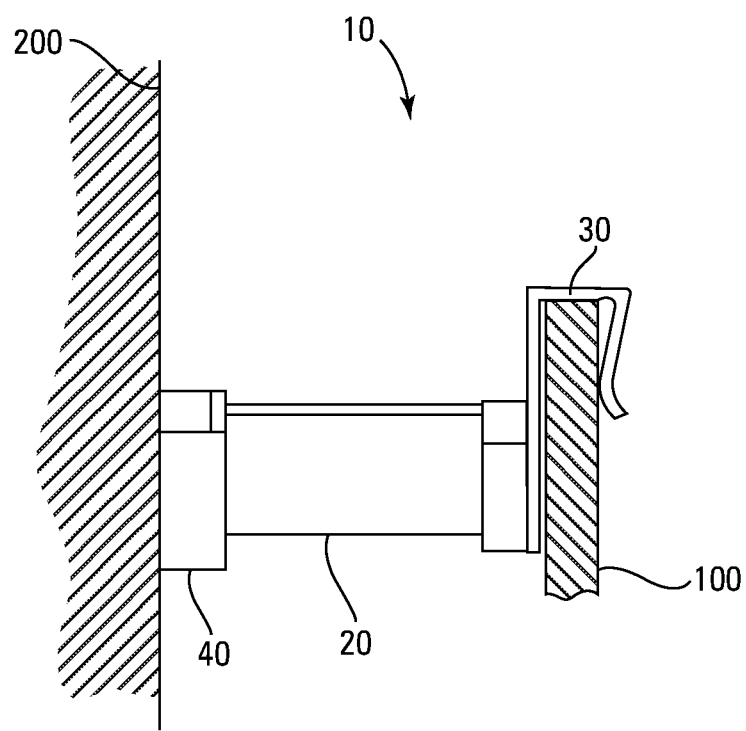
FIG. 11 is a side view of the stabilizer support in FIG. 1 placed in a gap formed between a wall and a laterally unsupported surface.

As shown in FIGS. 9 and 12, the foot plate 40 may be integrally formed with or fixedly attached to the second end 23 of the longitudinally extending beam 20 while the first end 22 of the beam 20 is configured and arranged for removable attachment to the first longitudinal end 22 of the beam 20.

The clip 30 may be integrally formed with or fixedly attached to the first end 22 of the longitudinally extending beam 20 while the second end 23 of the beam 20 is configured and arranged for removable attachment to the second longitudinal end of the beam 20.

Use

The support 10 is useful for providing support to laterally unsupported surface 100 to prevent or minimize movement of the laterally unsupported surface 100. In particular the support 10 is useful for decreasing the movement or rocking of a toilet tank against a wall 200. A toilet tank (laterally unsupported surface 100) can be quickly and easily stabilized with the support 10 by (i) obtaining a stabilizer support 10, (ii) placing a longitudinal end of the beam 20 into direct physical contact with a wall 200 behind a laterally unsupported surface 100, (iii) measuring the distance between the wall 200 and the unsupported lateral surface 100 using the graded intervals 50 marked on the beam 20, (iv) removing a portion of the first longitudinal end 22 or second longitudinal end 23 of the beam 20 to produce an exposed longitudinal end (not numbered) such that the longitudinal length 21 of the beam 20 from the exposed end to a point of engagement (not numbered) with the clip 30 or foot plate 40 on the opposite end is the same as the measured distance (not numbered), (v) engaging the missing foot plate 40 or clip 30 to the exposed end of the beam 20, and (vi) placing the stabilizer support 10 in a gap formed between the wall 200 and the laterally unsupported surface 100 wherein the clip 30 engages the laterally unsupported surface 100 and the beam 20 extends longitudinally to the wall 200 such that the foot plate 40 engages the wall 200.

EXAMPLES

Separate and Distinct Components

As shown in FIG. 2, one longitudinal end of the beam 20 is removably attached to the clip 30 and the other longitudinal end of the beam 20 is left unengaged. The unengaged longitudinal end of the beam 20 is placed into direct physical contact with a wall 200 behind a laterally unsupported surface 100. The distance between the wall 200 and the unsupported lateral surface 100 (gap) is measured using the graded intervals 50 marked on the beam 20. A portion of the unengaged longitudinal end of the beam 20 in physical contact with the wall 200 is removed to produce an exposed end such that the longitudinal length 21 of the beam 20 from the exposed end to the point of attachment of the beam 20 with the clip 30 on the opposite end of the beam 20 is the same as the measured distance.

For example, if the measured distance from the wall 200 to the laterally unsupported surface 100 is twelve (12) graded intervals 50 long, then a user (not shown) could count twelve (12) intervals 50 from the point of engagement with the clip 30 and remove the remainder of the beam 20.

The longitudinal length 21 of the beam 20 from the point of engagement with the clip 30 to the exposed end would equal the measured distance.

The foot plate 40 is then attached to the exposed end of the beam 20 to form an assembled stabilizer support 10. The assembled stabilizer support 10 is then placed in the gap formed between the wall 200 and the laterally unsupported surface 100 so that the clip 30 engages the laterally unsupported surface 100 and the beam 20 extends longitudinally to the wall 200 such that the foot plate 40 engages the wall 200.

The above method would also work if the foot plate 40 is initially attached to the longitudinal beam 20 and clip 30 is attached to the exposed end of the beam 20. The clip 30 and foot plate 40 may also be fixedly attached to the beam 20 before the support 10 is placed in the gap.

Fixedly Attached Component

One longitudinal end of the beam 20 is fixedly attached to the clip 30 and the other longitudinal end of the beam 20 is left unengaged. The unengaged longitudinal end of the beam 20 is placed into direct physical contact with a wall 200 behind a laterally unsupported surface 100. The distance between the wall 200 and the unsupported lateral surface 100 (gap) is measured using the graded intervals 50 marked on the beam 20. A portion of the unengaged longitudinal end of the beam 20 in physical contact with the wall 200 is removed to produce an exposed end such that the longitudinal length 21 of the beam 20 from the exposed end to the point of attachment of the beam 20 with the clip 30 on the opposite end of the beam 20 is the same as the measured distance. The foot plate 40 is then attached to the exposed end of the beam 20 to form an assembled stabilizer support 10. The assembled stabilizer support 10 is then placed in the gap formed between the wall 200 and the laterally unsupported surface 100 so that the clip 30 engages the laterally unsupported surface 100 and the beam 20 extends longitudinally to the wall 200 such that the foot plate 40 engages the wall 200.

The above method would also work if the foot plate 40 is initially fixedly attached to the longitudinal beam 20 and clip 30 is removably attached to the exposed end of the beam 20.

Integrally Attached Component

As shown in FIGS. 9 and 12, one longitudinal end of the beam 20 is integrally formed with the foot plate 40 and the other longitudinal end of the beam 20 is left unengaged. The unengaged longitudinal end of the beam 20 is placed into direct physical contact with a wall 200 behind a laterally unsupported surface 100. The distance between the wall 200 and the unsupported lateral surface 100 (gap) is measured using the graded intervals 50 marked on the beam 20. A portion of the unengaged longitudinal end of the beam 20 in physical contact with the wall 200 is removed to produce an exposed end such that the longitudinal length 21 of the beam 20 from the exposed end to the point of engagement of the beam 20 with the foot plate 40 on the opposite end of the beam 20 is the same as the measured distance. The clip 30 is then attached to the exposed end of the beam 20 to form an assembled stabilizer support 10. The assembled stabilizer support 10 is then placed in the gap formed between the wall 200 and the laterally unsupported surface 100 so that the clip 30 engages the laterally unsupported surface 100 and the beam 20 extends longitudinally to the wall 200 such that the foot plate 40 engages the wall 200.

The above method would also work if the clip 30 is integrally formed with one longitudinal end of the beam 20 and foot plate 40 is removably attached to the exposed end of the beam 20.

I claim:

1. A stabilizer support, comprising:
   (a) a longitudinally extending rigid beam having a longitudinal length, a first longitudinal end and a second longitudinal end, and a uniform cross-sectional shape along the longitudinal length of the beam proximate each of the first longitudinal end and the second longitudinal end,
   (b) a clip separate and distinct from the beam, and having a first slide fit connector for accepting a single immutable fixed distance longitudinal insertion of the first longitudinal end of the beam into the first slide fit connector, and
   (c) a foot plate separate and distinct components from the beam, and having a second slide fit connector for accepting a single immutable fixed distance longitudinal insertion of the second longitudinal end of the beam into the second slide fit connector,
   (d) whereby an assembled stabilizer support has a single immutable fixed longitudinal length when under longitudinal compression.

2. The stabilizer support, as set forth in claim 1, wherein the clip is generally U-shaped.

3. The stabilizer support, as set forth in claim 1, wherein the clip has a center portion located intermediate and secured at opposite longitudinal ends to substantially laterally extending first and second legs.

4. The stabilizer support, as set forth in claim 1, marked at graded substantially equally spaced intervals along a longitudinal length of the beam.

5. The stabilizer support, as set forth in claim 1, wherein the clip has a channel extending in the first longitudinal direction configured and arranged for engagement with the first longitudinal end of the beam and the foot plate has a channel extending in the second longitudinal direction configured and arranged for engagement with the second longitudinal end of the beam.

6. The stabilizer support, as set forth in claim 3, wherein the clip further comprises an aperture through the second leg of the clip.

7. A method of using a stabilizer support, comprising the steps of:
   (a) obtaining a stabilizer support as set forth in claim 1,
   (b) measuring the distance between a wall and an unsupported lateral surface,
   (c) removing a portion of a longitudinal end of the beam to form a shortened beam such that the longitudinal length of the shortened beam is the measured distance,
   (d) inserting the first longitudinal end of the shortened beam into the first slide fit connector on the clip and inserting the second longitudinal end of the shortened beam into the second slide fit connector on the foot plate to form an assembled stabilizer support, and
   (e) placing the assembled stabilizer support in a gap formed between the wall and the laterally unsupported surface wherein the clip engages the laterally unsupported surface and the beam extends longitudinally to the wall such that the foot plate engages the wall.

* * * * *